United States Patent [19]
Yaginuma et al.

[11] Patent Number: 5,668,190
[45] Date of Patent: Sep. 16, 1997

[54] FOAMABLE SILICONE RUBBER COMPOSITION

[75] Inventors: Atsushi Yaginuma, Gunma-machi; Takeshi Miyao, Annaka; Hironao Fujiki, Takasaki, all of Japan

[73] Assignee: Shin-Etsu Chemical Co., Ltd., Tokyo, Japan

[21] Appl. No.: 773,311

[22] Filed: Dec. 24, 1996

[30] Foreign Application Priority Data

Dec. 25, 1995 [JP] Japan ................................ 7-351009

[51] Int. Cl.$^6$ ............................................ C08J 9/00
[52] U.S. Cl. .................... 521/142; 521/143; 521/145; 521/149; 521/150; 521/154
[58] Field of Search ................................ 521/143, 142, 521/145, 149, 150, 154

[56] References Cited

U.S. PATENT DOCUMENTS

| | | | |
|---|---|---|---|
| 4,987,155 | 1/1991 | Inoue et al. | 521/154 |
| 5,135,960 | 8/1992 | Higuchi et al. | 521/154 |

*Primary Examiner*—Morton Foelak
*Attorney, Agent, or Firm*—Oblon, Spivak, McClelland, Maier & Neustadt, P.C.

[57] ABSTRACT

A silicone sponge rubber having a great tensile strength even when it has a low foam density can be obtained from a foamable silicone rubber composition including:

(A) a polyolefin dispersion obtained by polymerizing monomers having polymerizable aliphatic unsaturated double bonds, dispersed in a dispersion medium of an organopolysiloxane having a viscosity of from 50 cSt to 1,000,000 cSt at 25° C. whose molecular chain both terminals are terminated with silanol groups, to form a polyolefin in the silanol group-containing organopolysiloxane;

(B) an organohydrogenpolysiloxane having at least two hydrogen atoms in one molecule;

(C) at least one selected from the group consisting of water, an alcohol, a silanol group-containing organosilane, and a silanol group-containing siloxane having a viscosity of less than 50 cSt at 25° C.; and (D) a platinum family metal catalyst.

10 Claims, No Drawings

FOAMABLE SILICONE RUBBER COMPOSITION

BACKGROUND OF THE INVENTION

1. Field of the Invention

This invention relates to a foamable silicone rubber composition, and more particularly to a foamable silicone rubber composition from which a silicone sponge rubber having a great tensile strength can be obtained even when it has a low foam density.

2. Description of the Prior Art

As known in the art, silicone sponge rubber is usually obtained by curing and foaming a foamable composition mainly composed of an organopolysiloxane, and an inorganic filler or organic filler is added in order to improve the tensile strength of the silicone sponge rubber.

For example, the inorganic filler may include silica fillers surface-treated with organosilicon compounds such as organochlorosilane, organopolysiloxane and hexaorganosilazane (Japanese Patent Publication (kokai) No. 3-56542 corresponding to U.S. Pat. No. 4,987,115). The organic filler may include resin copolymers (Japanese Patent Publication (kokoku) No. 5-53823 corresponding to U.S. Pat. No. 4,418,157).

Addition of such fillers, however, can not bring about so much improvement in tensile strength of the resulting silicone sponge rubbers. The addition of inorganic filler may cause an increase in viscosity of compositions and a decrease in elasticity of silicone sponge rubbers (foams). It also results in an increase in production cost.

SUMMARY OF THE INVENTION

Accordingly, an object of the present invention is to provide a foamable silicone rubber composition from which a silicone sponge rubber having a great tensile strength and a sufficient elasticity can be obtained even when it has a low foam density.

As a result of extensive studies, the present inventors have discovered that a specific foamable silicone rubber composition can solve the above problems.

That is, the present invention provides a foamable silicone rubber composition comprising;

(A) a polyolefin dispersion obtained by polymerizing monomers having a polymerizable aliphatic unsaturated double bond, dispersed in a dispersion medium of an organopolysiloxane having a viscosity of from 50 cSt to 1,000,000 cSt at 25° C. whose molecular chain both terminals are terminated with a silanol group, to form a polyolefin in said silanol group-containing organopolysiloxane;

(B) an organohydrogenpolysiloxane represented by the average compositional formula (1):

$(R^1)_a(H)_bSiO_{(4-a-b)/2}$     (1)

wherein $R^1$ represents a substituted or unsubstituted monovalent hydrocarbon group having no aliphatic unsaturated bond, a and b are positive numbers that satisfy $0<a<3$, $0.05 \leq b<3$ and $0.8 \leq a+b \leq 3$; and having at least two hydrogen atoms in one molecule;

(C) at least one selected from the group consisting of water, an alcohol, a silanol group-containing organosilane, and a silanol group-containing siloxane having a viscosity of less than 50 cSt at 25° C.; and (D) a platinum family metal catalyst.

The present invention also provides a silicone sponge rubber obtained by curing this composition.

The silicone sponge rubber obtained by curing and foaming the foamable silicone rubber composition of the present invention has a great tensile strength and a good elasticity even when it has a low foam density.

DESCRIPTION OF THE PREFERRED EMBODIMENTS

Component (A)

The component (A) is a polyolefin dispersion obtained by polymerizing monomers having polymerizable aliphatic unsaturated double bonds, dispersed in a dispersion medium of an organopolysiloxane having a viscosity of from 50 cSt to 1,000,000 cSt at 25° C. whose molecular chain both terminals are terminated with silanol groups, to form a polyolefin in the silanol group-containing organopolysiloxane.

The silanol group-containing organopolysiloxane in this polyolefin dispersion does not form any graft copolymer with the polyolefin, and afterwards turns to a main polymer component of the silicone sponge rubber obtained by curing the composition (hereinafter "silicone sponge rubber") of the present invention.

Meanwhile, the polyolefin acts as a reinforcing filler or an extender filler at the time of curing. This polyolefin can be present in the silanol group-containing organopolysiloxane in a more stable and uniform state of fine particles than conventional resin copolymers, and hence can be well effective as the reinforcing filler and extender filler.

Silanol group-containing organopolysiloxane:

The above silanol group-containing organopolysiloxane that constitutes the component (A) is an organopolysiloxane whose molecular chain both terminals are terminated with silanol groups. This organopolysiloxane has a viscosity at 25° C. within the range of from 50 to 1,000,000 cSt, and preferably from 500 to 100,000 cSt. If it has a viscosity lower than 50 cSt, the silicone sponge rubber obtained may be brittle, and if on the other hand it has a viscosity higher than 1,000,000 cSt, the composition may have a high viscosity to make workability poor.

The silanol group-containing organopolysiloxane may include, e.g., compounds represented by the following general formula (2):

$HO[(R^1)_2SiO]_xH$     (2)

wherein $R^1$ represents a substituted or unsubstituted monovalent hydrocarbon group having no aliphatic unsaturated bond, and X is a number that satisfies the above viscosity range, which is usually an integer of 20 or more.

The monovalent hydrocarbon group represented by $R^1$ in the general formula (2) may include, e.g., alkyl groups having 1 to 6 carbon atoms, such as a methyl group, an ethyl group and a propyl group; cycloalkyl groups having 6 to 10 carbon atoms, such as a cyclohexyl group; aryl groups having 6 to 10 carbon atoms, such as a phenyl group and a tolyl group; aralkyl groups having 7 to 12 carbon atoms, such as a benzyl group, a 2-phenylethyl group and a 2-phenylpropyl group; and any of these groups at least part of hydrogen atoms of which has been substituted with a halogen atom or the like (e.g., a 3,3,3-trifluoropropyl group). A methyl group is preferred.

Polyolefin:

The polyolefin that constitutes the component (A) is a polymer of monomers having polymerizable aliphatic unsaturated double bonds, which may be a polymer of monofunctional monomers or a polymer of polyfunctional monomers. The polyolefin may take any form of a single polymer, a copolymer or a block copolymer.

The polyolefin is present in the form of solid fine particles in the silanol group-containing organopolysiloxane, and may have an average particle diameter within the range of usually from 0.1 to 50 µm, and preferably from 10 to 15 µm.

The monofunctional olefin monomers used as materials for the polyolefin may include, e.g., alkenes such as ethylene, propylene and butylene; halogenated alkenes such as vinyl chloride; vinyl esters such as vinyl acetate; vinyl group-containing aromatic compounds such as styrene, cyclic substituted styrene, and vinyl naphthalene; unsaturated carboxylic acids such as acrylic acid, or salts thereof; and acrylates such as ethyl acrylate, butyl acrylate and methyl acrylate.

As a di-substituted ethylene of $CH_2=CX_2$ type (wherein X represents a substituent other than a hydrogen atom), it may include, e.g., vinylidene fluoride, vinylidene chloride, methacrylic acid or salts thereof, methacrylate, methacrolein, and methacrylonitrile.

A di-substituted ethylene of CHX=CHX type (wherein X is as defined above) such as vinylene carbonate may also be used.

As monomers readily polymerizable in the presence of other monomers such as indene and cumarone, they may include maleic anhydride, maleic acid, fumaric acid, or esters of these, and stilbene.

The polyfunctional olefin monomers, i.e., monomers having at least two polymerizable aliphatic unsaturated double bonds may include, e.g., esters of acrylic or methacrylic acid with an unsaturated alcohol, such as allyl methacrylate, methallyl acrylate, methallyl methacrylate, vinyl acrylate and vinyl methacrylate; hydrocarbons such as divinylbenzene and vinylcyclohexene; polyol esters of acrylic or methacrylic acid, such as ethylene dimethacrylate, tetramethylene dimethacrylate and pentaerythritol tetramethacrylate; and conjugated diolefins such as 1,3-butadiene, isoprene and chloroprene.

Preparation of polyolefin dispersion:

The dispersion formed of the silanol group-containing organopolysiloxane and polyolefin as described above is obtained by polymerizing at least one kind of the monomers having polymerizable aliphatic unsaturated double bonds, in the silanol group-containing organopolysiloxane in the presence of a polymerization initiator.

Polymerization initiator:

The polymerization initiator (i.e., an organic radical initiator) used in the above reaction may be any of those conventionally known, and may include, e.g., organic peroxides such as benzoyl peroxide, 2,4-dichlorobenzoyl peroxide and tert-butyl peroxide; hydroperoxides such as tert-butyl hydroperoxide, cumene hydroperoxide and decylene hydroperoxide; cyclic peroxides such as ascaridole and 1,5-dimethdylhexane-1,5-peroxide; and peroxy esters such as tert-butyl perbenzoate, tert-butylperoxyisopropyl carbonate, tert-butyl peroctanate and tert-butyl peracetate.

It is also possible to use azo compounds wherein a tertiary carbon atom and at least one selected from the group consisting of a nitrile group, a carboxyalkyl group, a cycloalkyl group, an alkyl group and a group represented by the formula: YOOC (Y is an alkyl group) are bonded to the nitrogen atom constituting the azo bond.

When the above reaction is carried out, the monomers may usually be mixed in an amount of from 50 to 200 parts by weight, preferably from 40 to 200 parts by weight, and more preferably from 80 to 120 parts by weight, based on 100 parts by weight of the silanol group-containing organopolysiloxane. The polymerization initiator may usually be mixed in an amount of from 0.1 to 0.7 part by weight, and preferably from 0.2 to 0.5 part by weight, based on 100 parts by weight of the monomers.

The polymerization reaction may usually be carried out at a temperature of from 40° C. to 150° C., and preferably from 50° C. to 130° C., which may be set in accordance with the type of the polymerization initiator.

The reaction may usually be carried out for 1 hour to 10 hours, which may be set in accordance with the monomer, the polymerization initiator and the polymerization reaction temperature.

Component (B)

The component (B) is an organohydrogenpolysiloxane represented by the average compositional formula (1):

$$(R^1)_a(H)_b SiO_{4-a-b/2} \tag{1}$$

wherein $R^1$ is as defined previously, and b are positive numbers that satisfy $0<a<3$, preferably $1 \leq a \leq 2$, $0.05 \leq b<3$, preferably $0.1 \leq b \leq 2$, and $0.8 \leq a+b \leq 3$, preferably $1 \leq a+b \leq 2.7$, and having at least two, preferably 3 or more hydrogen atoms bonded to silicon atoms (i.e., Si—H groups) in one molecule.

A part of the SiH groups in this compound causes condensation reaction with the silanol groups of the component (A) to form a cured product, and the remaining part of the SiH groups simultaneously causes condensation reaction with the hydroxyl groups of the component (C) to form a sponge (a foam).

In the average compositional formula (1), the monovalent hydroxyl group represented by $R^1$ may include those exemplified in the compound of the general formula (2).

The component (B) may have any molecular structure, a straight-chain, cyclic, branched or network structure. In usual instances, those having a straight-chain or cyclic structure are used.

The component (B) may be used alone or in combination of two or more kinds.

The component (B) may usually have a viscosity of from 1 to 30,000 cSt, and preferably from 1 to 10,000 cSt, at 25° C., but without any particular limitations.

The component (B) organohydrogenpolysiloxane may include straight-chain or cyclic structure compounds represented by the following average compositional formulas (3) and (4).

$$R^2[(R^1)_2 SiO]_g[R^2 HSiO]_h Si(R^1)_2 R^2 \tag{3}$$

$$[(R^1)_2 SiO]_g[R^1 HSiO]_h \tag{4}$$

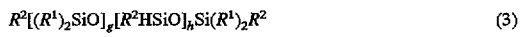

wherein $R^1$ is as defined previously, $R^2$ represents a hydrogen atom or a substituted or unsubstituted monovalent hydrocarbon group having no aliphatic unsaturated bond, g is an integer of 0 to 100, and h is an integer of 2 to 100, preferably 3 to 100.

The component (B) may be mixed in an amount corresponding to from 1 to 20 equivalent weight, and preferably from 1 to 10 equivalent weight, in terms of the number of hydrogen atoms bonded to silicon atoms (i.e., Si—H Groups) in the component (B), based on the total of the silanol groups in the component (A) and the hydroxyl groups in the component (C). If the component (B) is mixed in a too small amount, the composition can not be well cured and foamed. If on the other hand it is in a too large amount, unreacted SiH groups may remain in the silicone sponge rubber obtained after curing and foaming, to cause a deterioration of physical properties such as compression set and heat resistance.

Component (C)

The component (C) is at least one selected from the group consisting of water, an alcohol, a silanol group-containing organosilane, and a silanol group-containing siloxane having a viscosity of less than 50 cSt at 25° C.

The alcohol may include monohydric or polyhydric alcohols having 1 to 12 carbon atoms, and preferably methanol, ethanol, propanol, isopropyl alcohol, butanol, lauryl alcohol and octyl alcohol.

The silanol group-containing organosilane may include compounds having one or two silanot group(s) in its molecule represented by the formulas (5) and (6):

  (5)

  (6)

wherein $R^1$ is as defined previously.

Stated specifically, the compounds are exemplified by dimethylsilanediol, diphenylsilanediol, dimethylphenylsilanol, and trimethylsilanol.

The silanol group-containing organosiloxane may include liner or cyclic structure compounds having structural units of:

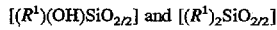

wherein $R^1$ is as defined previously; (provided that it has at least one hydroxyl group) and having a viscosity of less than 50 cSt, and preferably from 1 to 30 cSt, at 25° C. Where the silanol group-containing organosiloxane has a linear structure, it may be terminated with a unit of $[(R^1)_2(OH)SiO_{1/2}]$ or $[(R^1)_3SiO_{1/2}]$.

Stated specifically, the compound is exemplified by a compound represented by the formula (7):

  (7)

wherein $R^1$ is as defined previously, and n is a positive number that makes the viscosity at 25° C. less than 50 cSt.

The component (C) may preferably be mixed in an amount of from 0.1 to 20 parts by weight, and more preferably from 0.2 to 10 parts by weight, based on 100 parts by weight of the component (A). If the component (C) is in a too small amount, no sufficient foamability can be obtained. If on the other hand it is in a too large amount, the cells (unit globules) of the silicone sponge rubber may have a non-uniform size and may have a low tensile strength.

Component (D)

The component (D), platinum family metal catalyst, accelerates the condensation reaction of the silanol groups in the component (A) with the hydrogen atoms bonded to the silicon atoms in the component (B), and the condensation reaction of the hydroxyl groups in the component (C) with the hydrogen atoms bonded to the silicon atoms in the component (B).

As this platinum family metal catalyst, conventionally known catalysts may be used, which may include, e.g., fine-particle platinum adsorbed on a carrier such as silica, alumina or silica gel; complexes of platinic chloride, chloroplatinic acid or chloroplatinate hexahydrate with an olefin or divinyldimethylpolysiloxane; an alcohol solution of chloroplatinate hexahydrate; palladium catalysts; and rhodium catalysts.

The component (D) may be mixed in an amount of what is called catalytic quantity, usually within the range of from 1 to 500 ppm, and preferably form 10 to 100 ppm, in terms of platinum group metal quantity, based on the total weight of the siloxane in the composition. If the component (D) is in a too small amount, the composition may be insufficiently cured and foamed. On the other hand, its use in a too large amount brings about an economical disadvantage.

Other Additives

To the foamable silicone rubber composition of the present invention, an inorganic filler, an antistatic agent, a heat resistant agent, a flame retardant, a pigment, glass fiber, carbon fiber and so forth may be optionally added.

The inorganic filler is exemplified by fumed silica, precipitated silica, diatomaceous earth, fine quartz powder, iron oxide, titanium oxide, aluminum oxide, aluminum silicate, zinc white and carbon black.

An organosilicon compound which is non-cyclic and has a vinyl group may be further added in order to accelerate curing reaction.

These may be mixed in an amount controlled so as not to obstruct the object of the present invention.

It is preferable to add a platinum catalyst inhibitor such as a polymethylvinylsiloxane cyclic compound, an acetylene type alcohol or a peroxide.

EXAMPLES

The present invention will be described below by giving Examples. In the following, the viscosity is indicated as values at 25° C. In Examples and Comparative Example, "part(s)" refers to "part(s) by weight".

Preparation Example 1

In a three-necked flask with an internal volume of 2 liter, having a reflux device and a thermometer, 380 g of dimethylpolysiloxane having a viscosity of 5,000 cSt and whose molecular chain both terminals were terminated with silanol groups, 180 g of styrene and 150 g of n-butyl acrylate were charged and mixed, followed by further addition of 3 g of t-butyl perbenzoate, and the mixture obtained was heated at a temperature of 120° C. for three hours.

Then, the heated mixture was kept at the same temperature for 4 hours under reduced pressure of 5 mmHg. Thus, 520 g of a polyolefin dispersion (A) was prepared.

Example 1

100 parts of the polyolefin dispersion (A), 3 parts of trimethylsilanol and 0.5 part of a complex of chloroplatinate hexahydrate with divinylmethylpolysiloxane (1% by weight in terms of platinum metal) were mixed, followed by further addition of 0.35 part of tetravinyltetramethylcyclotetrasiloxane represented by the formula:

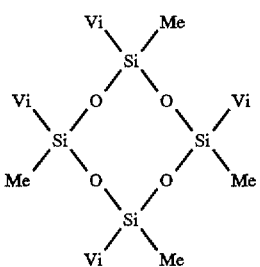

(in the formula, Me is a methyl group, and Vi is a Vinyl group) as a retarding agent and 10 parts of organohydrogenpolysiloxane represented by the average compositional formula:

$(CH_3)_3SiO[SiH(CH_3)O]_{38}Si(CH_3)_3$ (the number of hydrogen atoms bonded to silicon atoms corresponds to 5, based on the total number of OH groups in the composition). Thus, a foamable silicone rubber composition (A) was prepared.

Next, the foamable silicone rubber composition (A) was cured and foamed at room temperature to obtain a silicone sponge rubber.

The silicone sponge rubber thus obtained had a density of 0.18 g/cm³ as measured by the immersion method. Its tensile strength was measured according to JIS-K6301 to find that it was 12.5 kgf/cm².

Example 2

The procedure of Example 1 was repeated except that 3 parts of the trimethylsilanol used therein was replaced with 2 parts of isopropyl alcohol. Thus, a foamable silicone rubber composition (B) was prepared.

Next, the foamable silicone rubber composition (B) was cured and foamed at room temperature to obtain a silicone sponge rubber.

The density and tensile strength of the sponge rubber thus obtained were measured in the same manner as in Example 1. Results obtained are shown in Table 1.

Example 3

The procedure of Example 1 was repeated except that 3 parts of the trimethylsilanol used therein was replaced with 18 parts of a silanol group-containing organopolysiloxane represented by the average compositional formula:

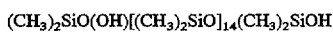

$(CH_3)_2SiO(OH)[(CH_3)_2SiO]_{14}(CH_3)_2SiOH$ and having a viscosity of 18 cSt. Thus, a foamable silicone rubber composition (C) was prepared.

Next, the foamable silicone rubber composition (C) was cured and foamed at room temperature to obtain a silicone sponge rubber.

The density and tensile strength of the sponge rubber thus obtained were measured in the same manner as in Example 1. Results obtained are shown in Table 1.

Comparative Example 1

100 parts of dimethylpolysiloxane having a viscosity of 700 cSt and whose molecular chain both terminals were terminated with silanol groups and 10 parts of dry process silica previously surface-treated with hexamethyldisilazane were mixed by means of a mixer under reduced pressure of 5 mmHg.

In the mixture obtained, 3 parts of trimethylsilanol and 0.5 part of the same platinum catalyst as used in Example 1 were mixed, followed by further addition of 0.35 part of tetramethyltetravinyltetracyclosiloxane and 10 parts of organohydrogenpolysiloxane represented by the average compositional formula:

$(CH_3)_3SiO[SiH(CH_3)O]_{38}Si(CH_3)_3$ (the number of hydrogen atoms bonded to silicon atoms corresponds to 5, based on the total number of OH groups in the composition). Thus, a foamable silicone rubber composition (D) was prepared.

Next, the foamable silicone rubber composition (D) was cured and foamed at room temperature to obtain a silicone sponge rubber.

The density and tensile strength of the sponge rubber thus obtained were measured in the same manner as in Example 1. Results obtained are shown in Table 1.

TABLE 1

|  | Density (g/cm³) | Tensile strength (kgf/c²) |
|---|---|---|
| Example 1 | 0.18 | 12.5 |
| Example 2 | 0.18 | 11.0 |
| Example 3 | 0.24 | 15.0 |
| Comparative Example 1 | 0.42 | 1.2 |

What is claimed is:

1. A foamable silicone rubber composition comprising;

(A) a polyolefin dispersion obtained by polymerizing monomers having a polymerizable aliphatic unsaturated double bond, dispersed in a dispersion medium of an organopolysiloxane having a viscosity of from 50 cSt to 1,000,000 cSt at 25° C. whose molecular chain both terminals are terminated with a silanol group, to form a polyolefin in said silanol group-containing organopolysiloxane;

(B) an organohydrogenpolysiloxane represented by the average compositional formula (1):

$$(R^1)_a(H)_bSiO_{(4-a-b)/2} \quad (1)$$

wherein $R^1$ represents a substituted or unsubstituted monovalent hydrocarbon group having no aliphatic unsaturated bond, a and b are positive numbers that satisfy $0<a<3$, $0.05 \leq b<3$ and $0.8 \leq a+b \leq 3$; and having at least two hydrogen atoms bonded to silicone atoms in one molecule;

(C) at least one member selected from the group consisting of water, an alcohol, a silanol group-containing organosilane, and a silanol group-containing siloxane having a viscosity of less than 50 cSt at 25° C.; and (D) a platinum family metal catalyst.

2. The foamable silicone rubber composition according to claim 1, wherein said polyolefin has an average particle diameter of from 0.1 μm to 50 μm.

3. The foamable silicone rubber composition according to claim 1, wherein said monomers having polymerizable aliphatic unsaturated double bonds are selected from the group consisting of an alkene, a halogenated alkene, a vinyl ester, a vinyl group-containing aromatic compound, an unsaturated carboxylic acid, a salt of the unsaturated carboxylic acid, an acrylate, vinylidene fluoride, vinylidene chloride, methacrylic acid, a salt of methacrylic acid, methacrylate, methacrolein, methacrylonitrile, vinylene carbonate, an ester of acrylic acid with an unsaturated alcohol, an ester of methacrylic acid with an unsaturated alcohol, divinylbenzene, vinylcyclohexene, a polyol ester of acrylic acid, a polyol ester of methacrylic acid, and a conjugated diolefin.

4. The foamable silicone rubber composition according to claim 1, wherein said component (B) is selected from the group consisting of a compound represented by the formula (3):

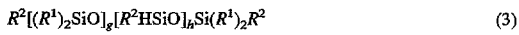
$$R^2[(R^1)_2SiO]_g[R^2HSiO]_hSi(R^1)_2R^2 \quad (3)$$

and a compound represented by the formula (4):

$$[(R^1)_2SiO]_g[R^1HSiO]_h \quad (4)$$

wherein $R^1$ is as defined above, $R^2$ represents a hydrogen atom or a substituted or unsubstituted monovalent hydrocarbon group having no aliphatic unsaturated bond, g is an integer of 0 to 100, and h is an integer of 2 to 100.

5. The foamable silicone rubber composition according to claim 1, wherein said alcohol is a monohydric or polyhydric alcohol having 1 to 12 carbon atoms.

6. The foamable silicone rubber composition according to claim 1, wherein said silanol group-containing organosilane is selected from the group consisting of a compound represented by the formula (5):

$$(R^1)_2Si(OH)_2 \quad (5)$$

and a compound represented by the formula (6):

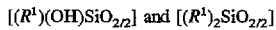
$$(R^1)_3Si(OH) \quad (6)$$

wherein $R^1$ is as defined above.

7. The foamable silicone rubber composition according to claim 1, wherein said silanol group-containing organosiloxane is a compound having structural units of:

$$[(R^1)(OH)SiO_{2/2}] \text{ and } [(R^1)_2SiO_{2/2}]$$

wherein $R^1$ is as defined above; (provided that it has at least one hydroxyl group) and having a viscosity of less than 50 cSt at 25° C., said silanol-containing organosiloxane being terminated with a unit of $[(R^1)_2(OH)SiO_{1/2}]$ or $[(R^1)_3SiO_{1/2}]$ where it has a linear structure.

8. The foamable silicone rubber composition according to claim 1, wherein said monomers having polymerizable aliphatic unsaturated double bonds are mixed in an amount of from 50 parts by weight to 200 parts by weight based on 100 parts by weight of the silanol group-containing organopolysiloxane dispersion medium.

9. The foamable silicone rubber composition according to claim 1, wherein said component (B) is mixed in an amount corresponding to from 1 to 20 equivalent weight in terms of the number of hydrogen atoms bonded to the silicon atoms in the component (B), based on the total of the silanol groups in the component (A) and the hydroxyl groups in the component (C), the component (C) is mixed in an amount of from 0.1 part by weight to 20 parts by weight based on 100 parts by weight of the component (A), and the component (D) is mixed in an amount of catalytic quantity.

10. A silicone sponge rubber obtained by curing the composition according to claim 1.

* * * * *